Feb. 10, 1925.
M. B. CAMPBELL
WATER HEATER
Filed June 4, 1923
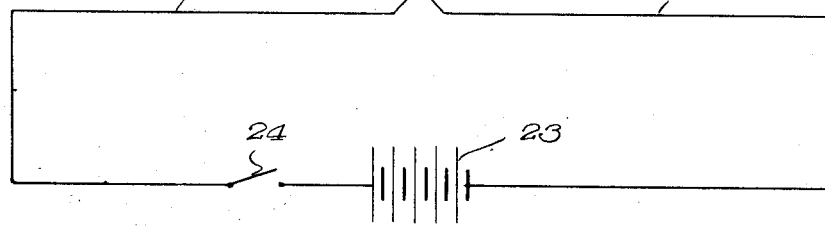
M. B. Campbell
INVENTOR
BY Victor J. Evans
ATTORNEY
WITNESS:

Patented Feb. 10, 1925.

1,526,204

UNITED STATES PATENT OFFICE.

MARK B. CAMPBELL, OF BREWTON, ALABAMA.

WATER HEATER.

Application filed June 4, 1923. Serial No. 643,375.

*To all whom it may concern:*

Be it known that I, MARK B. CAMPBELL, a citizen of the United States, residing at Brewton, in the county of Escambia and State of Alabama, have invented new and useful Improvements in Water Heaters, of which the following is a specification.

This invention relates to improvements in water heaters and has for an object the provision of an insulated tank or container having an electric heating element extending through and secured to one wall thereof.

Another object of the invention is the provision of a tank or container of novel construction which includes inner and outer walls spaced apart by solid end walls or plates and providing insulating spaces between the inner and outer walls for the retention of heat.

With the above and other objects in view, the invention further includes the following novel features and details of construction, to be hereinafter more fully described, illustrated in the accompanying drawings and pointed out in the appended claim.

In the drawings:—

Figure 1 is a vertical sectional view of the heater with the heating means illustrated in diagram.

Figure 2 is an enlarged vertical sectional view through the heating element.

Figure 3 is a horizontal sectional view taken on line 3—3 of Figure 1.

Referring to the drawings in detail wherein like characters of reference denote corresponding parts, the reference characters 10 and 11 indicate inner and outer shells or containers which are open at their opposite ends and are closed by plates 12 and 13 which provide end walls for the container. In addition, these plates provide spacing means for the inner and outer shells so that an insulating space 14 is provided which may provide a dead air space or vacuum, or may be filled with any suitable insulating material. The inner and outer shells 10 and 11 are secured to the marginal edges of the plates 12 and 13.

The plate 12 has extending therethrough inlet and outlet pipes 16 and 17 respectively, the former being provided for the admission of the water to be heated and the latter for the discharge of the heated water.

The plate 13 carries a heating element 18, the said element being attached to a plug 19 which has an engagement with a tubular member 20, while the latter is in threaded engagement with the walls of an opening provided in the plate 13. The heating element 18 is thus removably secured in place.

The terminals of the heating elements are connected to conductor wires 21 and 22, which may be connected to a suitable source of current, such as a battery 23 and one of these conductor wires is preferably provided with a switch 24 by means of which the current to the heating element 18 may be controlled.

The heater as shown and described will provide convenient means whereby a supply of water may be quickly and economically heated and kept in heated condition for an appreciable length of time due to the construction of the tank or container, so that a supply of heated water may be maintained.

The invention is susceptible of various changes in its form, proportions and minor details of construction and the right is herein reserved to make such changes as properly fall within the scope of the appended claim.

Having described the invention what is claimed is:—

A water heater of the character described embodying a tank including inner and outer spaced shells, each of the shells having relatively large registering openings in each end thereof, plates having their outer marginal reduced edges interposed between and secured to the inner and outer shells to close the openings and provide spacing elements, insulating means between the shells, inlet and outlet pipes extending through the upper plate into the tank, a tubular member extending within the tank and having its lower enlarged end threadedly engaged within the wall of an opening in the lower plate, a heating element removably secured within the tubular member, a dielectric plug threaded within the enlarged portion of the tubular member and having its shoulder resting flush with the bottom of the lower plate, and conductor wires connected to said heating element and a suitable source of current.

In testimony whereof I affix my signature.

MARK B. CAMPBELL.